(12) United States Patent
Resende et al.

(10) Patent No.: US 8,185,655 B2
(45) Date of Patent: May 22, 2012

(54) MAXIMIZING DIVERSITY IN A SUBSET OF ELEMENTS UTILIZING GRASP WITH PATH RELINKING

(75) Inventors: Mauricio Guilherme de Carvalho Resende, Holmdel, NJ (US); Abraham Duarte, Madrid (SA); Micael Gallego, Torrijos (ES); Rafael Martí, Valencia (ES)

(73) Assignee: AT&T Intellectual Property I, L.P., Atlanta, GA (US)

( * ) Notice: Subject to any disclaimer, the term of this patent is extended or adjusted under 35 U.S.C. 154(b) by 670 days.

(21) Appl. No.: 12/327,566

(22) Filed: Dec. 3, 2008

(65) Prior Publication Data
US 2010/0138373 A1   Jun. 3, 2010

(51) Int. Cl.
*G06F 15/173* (2006.01)
(52) U.S. Cl. ............... 709/238; 370/254; 706/46
(58) Field of Classification Search .................. 709/238; 370/254; 706/46
See application file for complete search history.

(56) References Cited

U.S. PATENT DOCUMENTS

| | | | | |
|---|---|---|---|---|
| 6,272,483 | B1 * | 8/2001 | Joslin et al. | 706/62 |
| 7,477,843 | B1 * | 1/2009 | Peeters et al. | 398/57 |
| 7,752,064 | B2 * | 7/2010 | Kauffman | 705/7.26 |
| 2003/0099014 | A1 * | 5/2003 | Egner et al. | 359/124 |
| 2009/0070281 | A1 * | 3/2009 | Solomon | 706/13 |

OTHER PUBLICATIONS

Resende, Mauricio et al; "A GRASP with path-relinking for private virtual circuit routing"; Sep. 2001, rev. Nov. 2002; AT&T Labs Research Technical Report TD-53RS47, whole document.*

Article entitled "Grasp and Path Relinking for the Max-Min Diversity Problem," Computer and Operations Research, published online at website http://www.optimization-online.org/DB_FILE/2008/02/1909.pdf, AT&T Labs Research Technical Report TD-7BSN88, AT&T Labs Research, Florham Park, NJ, Feb. 13, 2008; Inventors: Resende, et al., 23 pages.

Article entitled "Greedy Randomized Adaptive Search Procedures (GRASP)," AT&T Labs Research Technical Report TD-53RSJY, Version 2, dated Aug. 29, 2002; Inventors Resende, et al., 29 pages.

U.S. Patent Application entitled "Sensor Registration by Global Optimization Procedures," U.S. Appl. No. 11/821,041, filed Jun. 20, 2007.

U.S. Patent Application entitled "Global Optimization by Continuous Greedy Randomized Adaptive Search Procedure," U.S. Appl. No. 11/821,106, filed Jun. 20, 2007.

U.S. Patent Application entitled "Method and System for Network Migration Scheduling," U.S. Appl. No. 11/967,640, filed Dec. 31, 2007.

* cited by examiner

*Primary Examiner* — Thomas Dailey
(74) *Attorney, Agent, or Firm* — Hope Baldauff Hartman, LLC

(57) ABSTRACT

Methods, systems, and computer-readable media for maximizing diversity in a subset of elements selected from a set of elements are provided. An algorithm that combines the GRASP and path relinking heuristics is utilized to find an approximate solution to a max-min diversity problem modeled from the set of elements. The GRASP heuristic is applied to the set of elements for a number of iterations to generate a set of feasible solutions, and a best solution is determined from the set. The path relinking heuristic is then applied between a pair of solutions in the set of feasible solutions to generate a candidate solution. If the candidate solution is better than the best solution, then the best solution is replaced with the candidate solution, and the process is repeated until the path relinking heuristic has been applied between each pair of solutions in the set of feasible solutions.

19 Claims, 10 Drawing Sheets

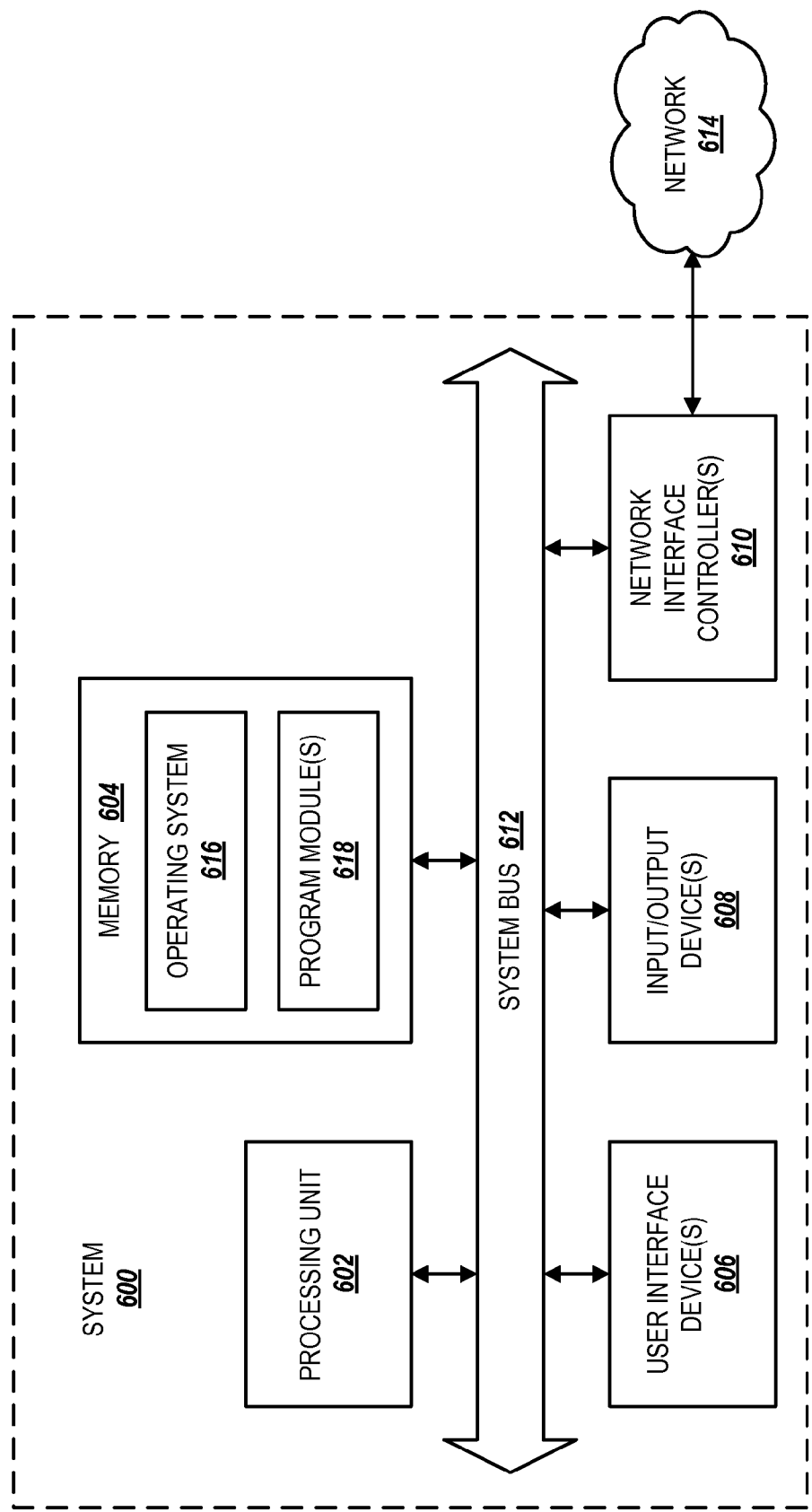

MAXIMIZING DIVERSITY IN A SUBSET OF ELEMENTS UTILIZING GRASP WITH PATH RELINKING

BACKGROUND

The problem of maximizing diversity deals with selecting a subset of elements from a given set in such a way that the diversity among the selected elements is maximized. The maximization of diversity in a selected subset has applications in telecommunications, plant breeding, social problems, and ecological preservation. There are generally two approaches to formulating these problems: the max-sum and the max-min models.

The max-min diversity problem ("MMDP") consists in selecting a subset of m elements from a set N of n elements in such a way that the minimum diversity between the chosen elements is maximized. While deriving a solution to an MMDP with a small number of elements in the set N may be trivial, as the number of elements in the set increases, the solution becomes very difficult, requiring an excessive amount of computer processing power.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the disclosure presented herein include methods, systems, and computer-readable media for maximizing diversity in a subset of elements selected from a set of elements. An algorithm that combines the greedy randomized adaptive search procedure ("GRASP") and path relinking heuristics is utilized to find an approximate solution to a max-min diversity problem modeled from the set of elements. The GRASP heuristic is applied to the set of elements for a number of iterations to generate a set of feasible solutions, and a best solution is determined from the set of feasible elements. After each GRASP iteration, the path relinking heuristic is then applied between a pair of solutions in the set of feasible solutions to generate a candidate solution. If the candidate solution is better than the best solution, then the best solution is replaced with the candidate solution, and the process is repeated until the path relinking heuristic has been applied between each distinct pair of solutions in the set of feasible solutions.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 6 is a block diagram showing an illustrative computer hardware and software architecture for a computing system capable of implementing aspects of the embodiments presented herein.

DETAILED DESCRIPTION

Figure 1:
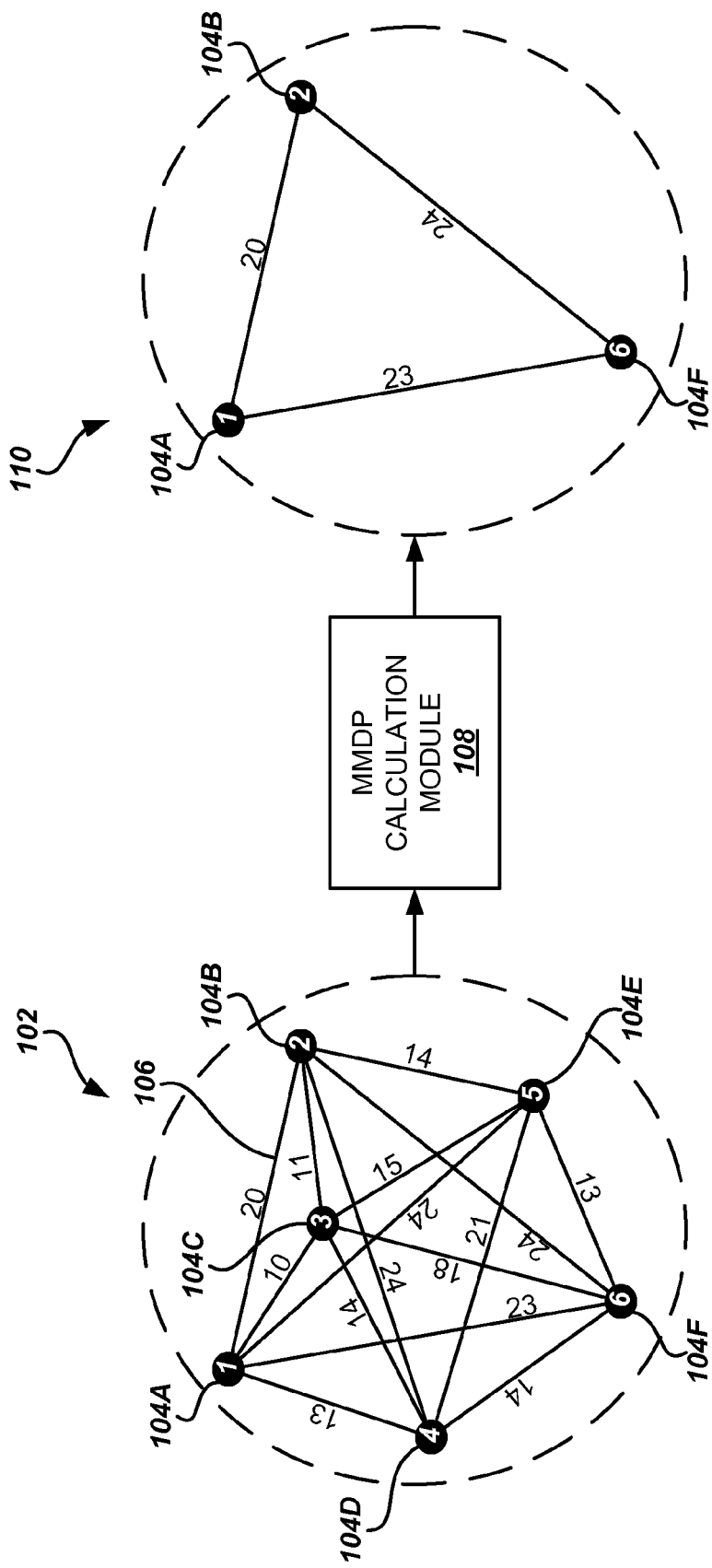
FIG. 1 is a block diagram illustrating an example of the max-min diversity problem, according to embodiments presented herein.
Figure 2C:
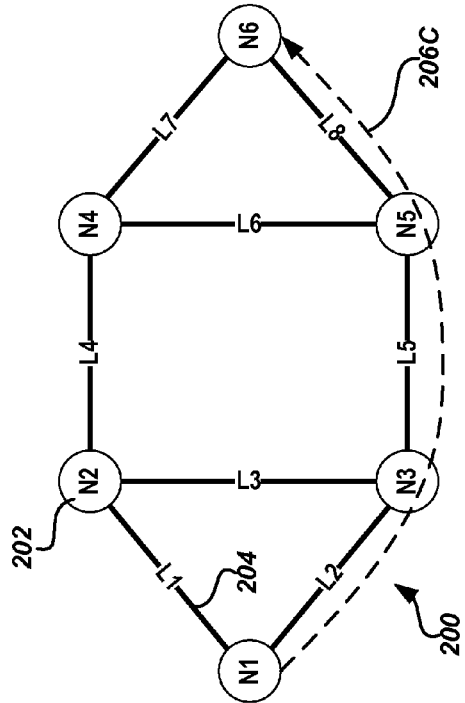
FIGS. 2A-2D are block diagrams illustrating the application of the max-min diversity problem to finding maximally distinct paths between two nodes in a telecommunications network, according to embodiments presented herein.
Figure 2D:
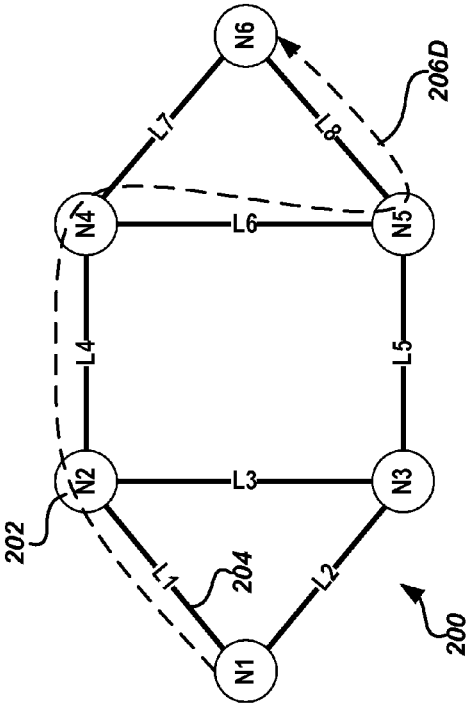
Figure 2A:
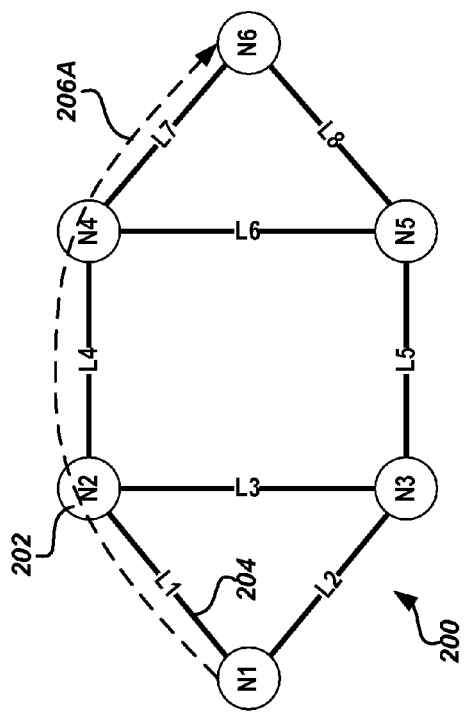
Figure 2B:
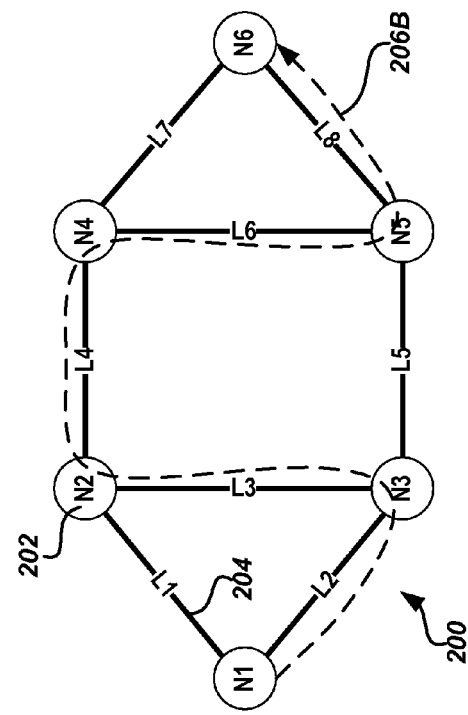

The following detailed description is directed to methods, systems, and computer-readable media for finding approximate solutions to the max-min diversity problem by combining greedy randomized adaptive search procedure ("GRASP") with path relinking methodologies. In the following detailed description, references are made to the accompanying drawings that form a part hereof, and that show by way of illustration specific embodiments or examples. In referring to the drawings, it is to be understood that like numerals represent like elements through the several figures, and that not all components described and illustrated with reference to the figures are required for all embodiments.

The max-min diversity problem ("MMDP") consists in selecting a subset M of m elements (|M|=m) from a set N of n elements (|N|=n) in such a way that the minimum distance or diversity between the chosen elements is maximized. Such problems may arise in selecting participants with varying demographics for a survey; scheduling final exams at a university in such a way as to maximize the time between exams for students; or determining the placements of antennae in a cellular network to achieve the best coverage possible.

The definition of distance between elements represents the diversity between the elements and is customized to specific applications. For example, the distance between elements may represent geographic distances between antennae placements in a cellular network, or times between exam slots in a university exam schedule. In some applications, each element may be represented by a set of K attributes. For example, each person in a population of potential survey participants may be represented by attribute values as to ethnicity, sex, age, and income level. If $s_{ik}$ represents the state or value of the k-th attribute of element i, where k=1, 2, ... K, then the distance between elements i and j can be defined as:

$$d_{ij} = \sqrt{\sum_{k=1}^{K} (s_{ik} - s_{jk})^2}.$$

In this case, $d_{ij}$ is simply the Euclidean distance between elements i and j.

The distance values $d_{ij}$ may then be used to express an objective formula $z_{MM}(x)$ for each feasible solution x consisting of m elements taken from the set N:

$$z_{MM}(x) = \min_{i<j} d_{ij} x_i x_j$$

for i, j=1, 2, ... n and where $x_i$=1 if the element i is selected in x and 0 otherwise, further subject to:

$$\sum_{i=1}^{n} x_i = m.$$

Thus, the MMDP may be expressed as:

$$\max \{z_{MM}(x) | x \in X\},$$

where X represents the discrete set of feasible solutions, in other words, all combinations of m elements selected from the set N.

FIG. 1 illustrates a set N 102 of n=6 elements 104A-104F. The distances between two elements in the set N 102 is shown by values assigned to the edges, such as the edge 106, drawn between each pair of elements. For example, the distance value between the element 1 104A and the element 2 104B in the set N 102 is 20. According to embodiments, an MMDP calculation module 108 may be utilized to apply the methodologies described herein to produce an approximate solution to the MMDP consisting of a subset M 110 of m=3 elements 104A, 104B, and 104F. The elements 104A, 104B, and 104F are selected from the elements 104A-104F of the set N 102 such that the minimum distance between the three elements is greater than or equal to the minimum distance between any other combination of three elements in the set N. As will be described below, the MMDP calculation module 108 may be implemented as software or hardware capable of performing the methodologies described herein for maximizing diversity in a subset of elements.

According to one embodiment, the methodologies described herein are utilized to find maximally diverse routes between two nodes in a telecommunications network. This analysis may be required to ensure survivability and reliability of the network. The solution to this problem is one of max-min diversity. As illustrated in FIGS. 2A-2D, the telecommunications network 200 may be represented by a number of nodes, such as the node N2 202, connected by a distinct set of links, such as the link L1 204. The nodes may represent routers or gateways within the network topology while the links represent distinct communication channels between nodes. A communication route or path between two nodes, such as the path 206A between nodes N1 and N6 illustrated in FIG. 2A, may pass through a number of nodes and links on the network 200.

For the purposes of determining the diversity between paths, each path between two distinct nodes u and v may be represented by a binary characteristic vector r of size s, where s equals the number of links in the network 200, such that, for i=1, 2, ... s, $r_i$=1 if and only if the i-th link is traversed by the path. If $p^1, p^2, \ldots p^q$ is a set of q paths from node u to node v represented by vectors $r^1, r^2, \ldots r^q$, then the difference or diversity between two paths $p^i$ and $p^j$ may be calculated as:

$$d_{ij} = s - \sum_{k=1}^{s} r_k^i r_k^j.$$

Thus, if two paths share all the same links, their difference will be zero, while if they are link disjoint, their difference will be s.

FIGS. 2A-2D illustrate four paths $p^1$ 206A, $p^2$ 206B, $p^3$ 206C, and $p^4$ 206D from node N1 to node N6 in the network 200. Each of the paths 206A-206D travel along one or more of the s=8 links L1-L8. The four paths $p^1$ 206A, $p^2$ 206B, $p^3$ 206C, and $p^4$ 206D are represented by the associated characteristic vectors:

$r^1$=(1, 0, 0, 1, 0, 0, 1, 0),
$r^2$=(0, 1, 1, 1, 0, 1, 0, 1),
$r^3$=(0, 1, 0, 0, 1, 0, 0, 1), and
$r^4$=(1, 0, 0, 1, 0, 1, 0, 1), respectively. The difference $d_{ij}$ between each distinct pair of paths $\{p^1, p^2\}$, $\{p^1, p^3\}$, $\{p^1, p^4\}$, $\{p^2, p^3\}$, $\{p^2, p^4\}$, and $\{p^3, p^4\}$ can be calculated using the formula provided above, giving:

$d_{12}$=7,
$d_{13}$=8,
$d_{14}$=6,
$d_{23}$=6,
$d_{24}$=5, and
$d_{34}$=7

An MMDP may be modeled for selecting a subset M of m=3 paths from the set N of all paths between nodes N1 and N6 (N=$\{p^1, p^2, p^3, p^4\}$) such that the selected paths have the maximum diversity between them. To derive a solution to this MMDP, the objective formula described above is calculated for the three feasible solutions $\{p^1, p^2, p^3\}$, $\{p^1, p^2, p^4\}$, and $\{p^2, p^3, p^4\}$, giving:

$z_{MM}(\{p^1, p^2, p^3\})$=min$\{d_{12}, d_{13}, d_{23}\}$=min$\{7,8,6\}$=6,
$z_{MM}(\{p^1, p^2, p^4\})$=min$\{d_{12}, d_{14}, d_{24}\}$=min$\{7,6,5\}$=5, and
$z_{MM}(\{p^2, p^3, p^4\})$=min$\{d_{23}, d_{24}, d_{34}\}$=min$\{6,5,7\}$=5.

In this example, simple inspection reveals that the best solution is the subset M=$\{p^1, p^2, p^3\}$ having the maximum minimum diversity of 6.

It will be appreciated by one skilled in the art that a solution to the MMDP consisting of selecting m=3 elements from the set N of n=4 elements, as illustrated above, is trivial, and can be solved simply by "brute force." In other words, the MMDP can be solved by calculating the objective function $z_{MM}(x)$ for each solution x in the set X of feasible solutions consisting of a combination of three elements selected from the set N. The optimal solution is the feasible solution x having the maximum value of the objective function $z_{MM}(x)$. In the example above, only 3 calculations of the objective function $z_{MM}(x)$ are required. However, as the number of elements in the set N increases, the MMDP problem becomes nontrivial, requiring a tremendous processing capacity to solve. For example, choosing a subset M of m=20 elements from a set N consisting of n=200 elements would produce a set X of feasible solutions containing approximately $1.614 \times 10^{27}$ combinations for which to calculate the objective function $z_{MM}(x)$.

Figure 3A:
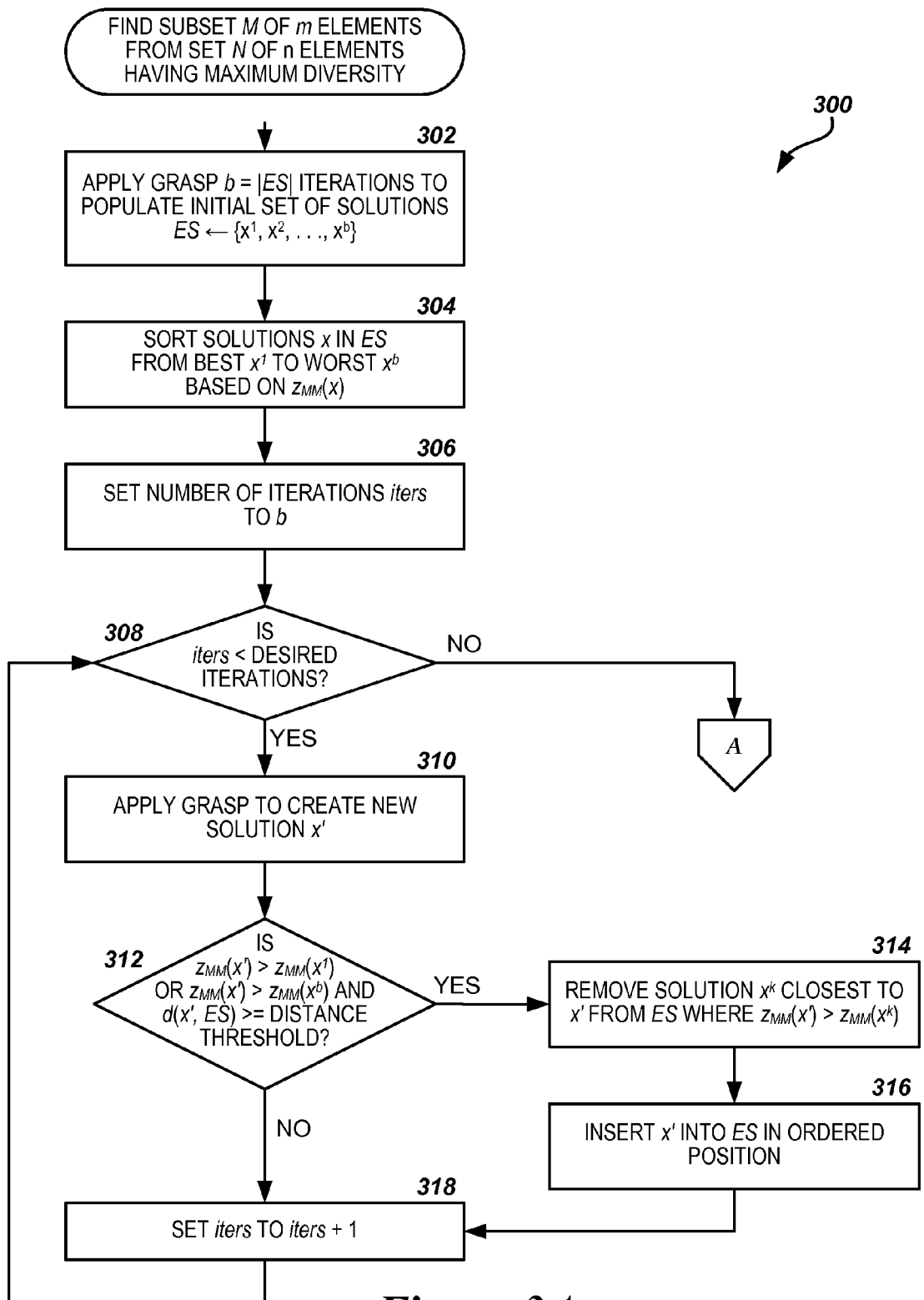
FIGS. 3A-3B are flow diagrams illustrating one method for utilizing the GRASP and path relinking methodologies to find optimal or near-optimal solutions to the MMDP, according to embodiments presented herein.

According to embodiments, a heuristic algorithm executing on a computer may be utilized to find an approximate solution to the MMDP consisting of a large set N, while requiring far less processing capacity than solving the problem. The algorithm embodied in a routine 300 illustrated in FIGS. 3A-3B utilizes a hybrid of the GRASP and path relinking methodologies to approximate a solution to the MMDP. Depending on the size of the set N and the number of iterations of the methodologies applied, the routine 300 may provide an optimal or near-optimal approximation of the MMDP.

It should be appreciated that the logical operations described herein in regard to FIGS. 3A-5C are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. In addition, more or fewer operations may be performed than shown, and the operations may be performed in a different order than illustrated in FIGS. 3A-3B, 4A-4B, and 5A-5C.

The routine 300 begins at operation 302, where the MMDP calculation module 108 applies a number of iterations of the GRASP methodology to the set N to build an "elite set" ES of b feasible solutions (b=|ES|). As is known in the art, each GRASP iteration consists of constructing a trial solution and then applying local search from the constructed solution. According to one embodiment, a greedy plus random construction algorithm GRC is utilized in the construction phase of each GRASP iteration. The GRC algorithm performs m steps to produce a solution with m elements selected from the set N. If the set Sel represents the partial solution under construction, the first element in Sel is selected randomly from the set N in the first step of the GRC algorithm.

At each subsequent step, the GRC algorithm selects a candidate element i* from the set CL of unselected elements in N (CL=N\Sel), with a large distance to the elements in the partial solution Sel. Specifically, the GRC algorithm first computes $d_j$ as the minimum distance between element j in the set CL and the selected elements. Then, the GRC algorithm constructs a restricted candidate list RCL with all the candidate (unselected) elements j with a distance value $d_j$ within a fraction $\alpha$ ($0 \leq \alpha \leq 1$) of a maximum distance d* of all $d_j$ values (d*=max $\{d_j | j \in CL\}$). Finally, the GRC algorithm randomly selects an element from the RCL to include in Sel.

The GRC algorithm implements a typical GRASP construction in which each candidate element is first evaluated by a greedy function to construct the RCL, and then an element is selected at random from the RCL. In an alternative embodiment, a random plus greedy construction algorithm GRC2 is utilized in the GRASP construction phase. In the GRC2 algorithm, the RCL is constructed by first selecting at random a fraction $\beta$ ($0 \leq \beta \leq 1$) of the elements from the set CL. Then, all the elements in RCL are evaluated by computing the minimum distance $d_j$ from the elements in the set Sel for all j$\in$RCL. The best element j* from the RCL is added to the partial solution Sel, in other words, the element j* such that:

$$d_{j^*} = \max_{j \in RCL} d_j.$$

The selection of values for the parameters $\alpha$ and $\beta$ utilized in the GRC and GRC2 algorithms, respectively, in the construction phase of the GRASP methodology may be done empirically and may depend on a number of factors, including, but not limited to, the size of the set N and the number of iterations of the GRASP methodology executed. In one embodiment, the values of the parameters are randomly determined according to an empirical distribution of probabilities.

In the local search phase of the GRASP methodology, the neighborhood of the trial solution produced in the construction phase is investigated until a local minimum is found. In one embodiment, an algorithm FLS is utilized in the local search phase of each GRASP iteration. Given the set N with n elements, and the trial solution Sel with m selected elements, the FLS algorithm computes the following values:

$$d_i = \min_{j \in Sel} d_{ij} \text{ and } d^* = \min_{j \in Sel} d_j,$$

where $d_i$ is the minimum distance of element i to the selected elements (those in the set Sel), and d* is the objective function of the current solution (d*=$z_{MM}$(Sel)).

The FLS algorithm then iteratively scans the elements in the solution Sel having $d_i$=d*, in lexicographical order, starting with a randomly selected element. For each element i having $d_i$=d*, the FLS algorithm examines the unselected elements CL (CL=N\Sel) for the first improving exchange. The unselected elements are also examined in lexicographical order, starting with a randomly selected element. According to one embodiment, an improving exchange exists when swapping the element i from the current solution Sel with an element j in the set CL of unselected elements would increase the objective function value d* for the current solution Sel. In another embodiment, an improving exchange may also include when the objective function value d* remains the same but the number elements i in the solution Sel having $d_i$=d* is reduced.

The FLS algorithm performs the first improving move (Sel←Sel\{i}∪{j}) found and then updates $d_i$ values for all elements i$\in$Sel as well as the objective function value d*, concluding the current iteration. The algorithm repeats iterations as long as improving moves can be performed and stops when no further improvement is possible.

In another embodiment, each iteration of the GRASP methodology utilizes a modified local search algorithm IMLS that considers for each element selected for exchange not only the distance with the closest element in the solution Sel, but also the second closest, third closest, and so on. The IMLS algorithm calculates the following value for each element i in Sel having $d_i$=d*:

$$e(i) = \sum_{j=1}^{k} \frac{d_i^j}{j},$$

where $d_i^1, d_i^2, \ldots d_i^k$ represents the k lowest distance value between element i and the m elements in the solution Sel (k<m). The value chosen for the parameter k may depend on a number of factors, including, but not limited to, the size of the set N and the number of iterations of the GRASP heuristic executed.

The IMLS algorithm selects, at each iteration, the element i* with the lowest e(i) value among the selected elements i$\in$Sel having $d_i$=d*. The algorithm then computes the e(s) value for all the unselected elements s$\in$N\Sel. The IMLS algorithm scans the unselected elements s$\in$N\Sel in decreasing order of e(s) and performs the first improving move (Sel←Sel\{i*}∪{s}) found. The definition of improving move is the same as described above in regard to the FLS algorithm (increasing the value of d*, or keeping d* the same and reducing the number of elements i in Sel with $d_i=d^*$). If no improving move is found, the algorithm selects the next element i* with lowest e(i) value among the selected elements i∈Sel with $d_i=d^*$ and tries to find an improving move. The IMLS algorithm stops when no further improvement is possible.

In operation 302, the MMDP calculation module 108 performs b iterations of the construction and local search algorithm of the GRASP methodology described above to create the elite set ES containing b feasible solutions. Then, the routine 300 proceeds from operation 302 to operation 304, where the MMDP calculation module 108 sorts the solutions in the elite set ES from best to worst based on the value of the objective function $z_{MM}(x)$ for each solution x in ES. As a result, $x^1$ will have the highest objective function value in the elite set ES while $x^b$ will have the lowest. From operation 304, the routine 300 proceeds to operation 306, where the MMDP calculation module 108 sets a count of the number of iterations iters to the value of b, indicating that the GRASP methodology has been executed b times to initially populate the elite set ES.

Next, the routine 300 proceeds to operation 308, where the MMDP calculation module 108 determines if the number of desired iterations of the GRASP methodology has been reached. It has been found that the subsequent application of the path relinking methodology to the pairs of solutions in the elite set ES is likely to be unsuccessful if the solutions are very similar. Therefore, after initially populating the elite set ES with b solutions, the MMDP calculation module 108 will continue to utilize the GRASP methodology to produce new solutions and replace an existing solution in the elite set ES with the new solution if the addition of the new solution increases either the quality or diversity of ES. The number of iterations for which to apply the GRASP methodology to create new solutions for the elite set ES may be determined empirically and may be adjusted according to a number of factors, including the amount of processing capacity available as well as the relative sizes of the sets N and ES.

If, at operation 308, the MMDP calculation module 108 determines that the number of desired iterations of the GRASP methodology has not been reached, in other words, iters is less than the number of desired iterations, then the routine 300 proceeds to operation 310, where the MMDP calculation module 108 applies the construction and local search phases of the GRASP methodology described above in regard to operation 302 to generate a new solution x'. Then, at operation 312, the MMDP calculation module 108 tests whether the generated solution x' qualifies for inclusion in the elite set ES. Specifically, if the new solution x' is better than the best solution $x^1$ in ES ($z_{MM}(x')>z_{MM}(x^1)$), then the new solution x' qualifies for inclusion in the elite set ES. Moreover, if the new solution x' is better than the worst solution $x^b$ in ES and is sufficiently different from the solutions currently in ES, then solution x' also qualifies for inclusion in the elite set ES.

To determine the difference between the new solution x' and the solutions in ES, the MMDP calculation module 108 calculates a distance value. Specifically, if $x_r^i$ is the value of the i-th variable for the elite solution r∈ES, and $x_t^i$ is the value of the i-th variable for the trial solution t, then the distance between the trial solution t and the solutions in ES is defined as:

$$d(t, ES) = b \cdot m - \sum_{x=1}^{b} \sum_{i:x_t^i=1} x_r^i.$$

The formula simply counts the number of times that each selected element in the trial solution t appears in the elite solutions and subtracts this value from the maximum possible distance (b·m). The maximum distance occurs when no element in the trial solution t appears in any of the solutions in ES.

Therefore if $z_{MM}(x')>z_{MM}(x^b)$ and d(x', ES) is greater than or equal to some distance threshold, then solution x' qualifies for inclusion in the elite set ES. The distance threshold value used to determine the qualification of x' may be set empirically. If it is determined in operation 312 that the new solution x' qualifies for inclusion in the elite set ES, then the routine 300 proceeds to operation 314, where the MMDP calculation module 108 removes from ES the closest solution $x^k$ to the new solution x' from among those worse than the solution x' in value ($z_{MM}(x')>z_{MM}(x^k)$). The routine 300 then proceeds from operation 314 to operation 316, where the MMDP calculation module 108 inserts the new solution x' into the elite set ES in the proper position such that ES remains ordered from best to worst. In this way the size of the elite set ES remains at b and the quality and diversity of ES is maintained.

Figure 3B:
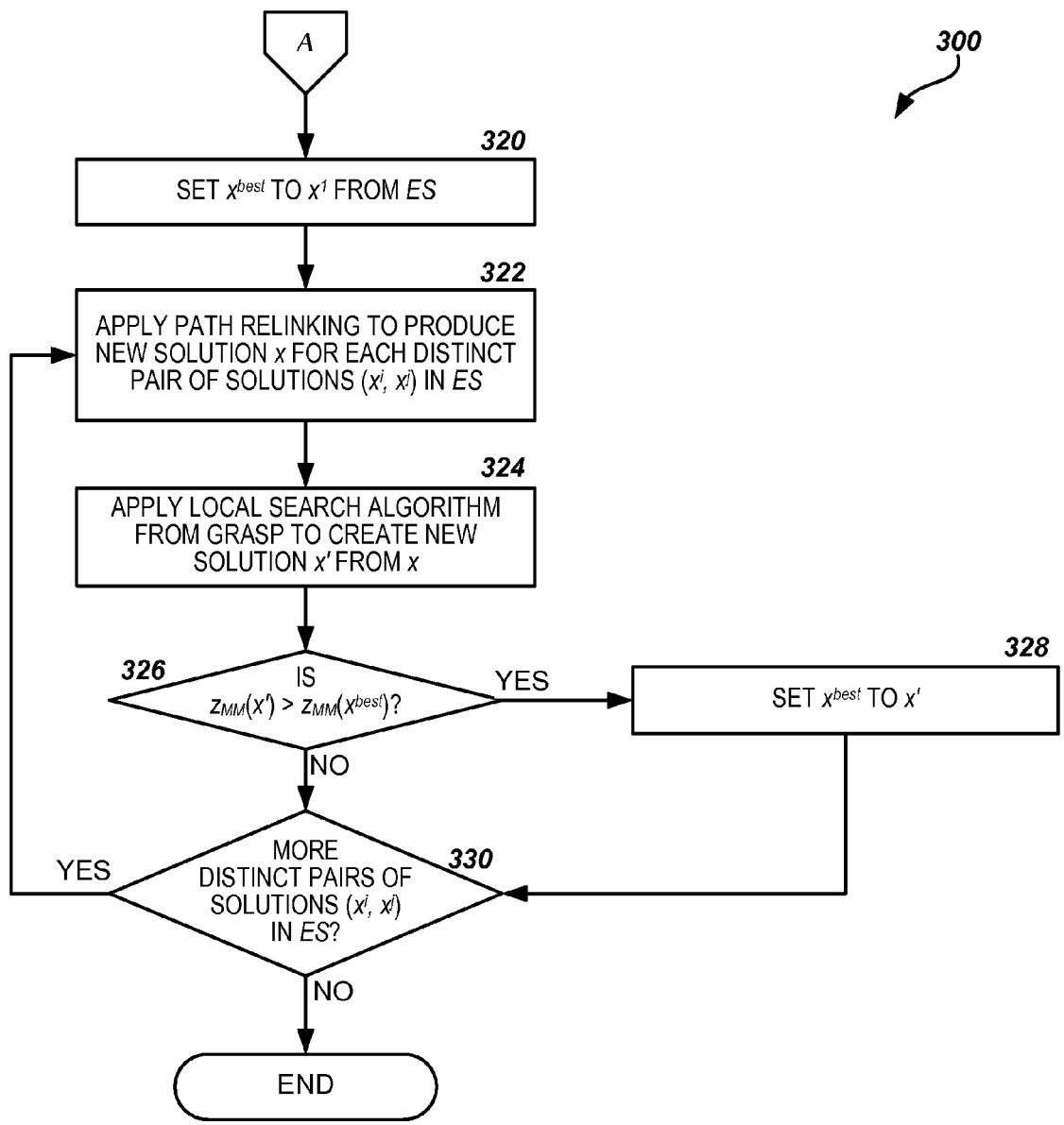

Next, the routine 300 proceeds to operation 318, where the MMDP calculation module 108 increments the count of the number of iterations iters. The routine 300 then returns to operation 308 where the MMDP calculation module 108 again determines if the number of desired iterations of the GRASP methodology has been reached. If the desired number of iterations has been reached, in other words, iters is not less than the number of desired iterations, then the routine 300 proceeds from operation 308 to operation 320 as illustrated in FIG. 3B, where the MMDP calculation module 108 sets the initial best solution $x^{best}$ to the best solution $x^1$ in the elite set ES. From operation 320, the routine 300 then proceeds to operation 322, where the MMDP calculation module 108 applies path relinking to generate solutions between all the pairs of solutions in ES.

As is known in the art, the path relinking methodology generates new solutions by exploring trajectories that connect high-quality solutions, starting from one of these solutions, called an "initiating solution", and generating a path in the neighborhood space that leads toward the other solutions, called "guiding solutions." This is accomplished by selecting moves that introduce attributes contained in the guiding solutions, and incorporating them in an intermediate solution initially originated in the initiating solution.

If x and y are two solutions in the elite set ES (x, y∈ES) having sets of m selected elements $Sel_x$ and $Sel_y$, respectively ($|Sel_x|=|Sel_y|=m$), then the path relinking methodology PR(x, y) starts with the first solution x, and gradually transforms the solution x into the second solution y, by swapping out elements selected in x with elements selected in y. The elements selected in both solutions x and y, $Sel_{xy}$, remain selected in the intermediate solutions generated by the path relinking methodology. If $p_0(x, y)=x$ is the initiating solution in the path P(x, y) from x to y, then the next solution $p_1(x, y)$ in this path is obtained by unselecting in $p_0(x, y)$ a single element i∈$Sel_{x-y}$, and selecting a single element j∈$Sel_{y-x}$, thus obtaining:

$$Sel_{p1(x,y)}=Sel_{p0(x,y)}\backslash\{i\}\cup\{j\},$$

where $Sel_{x-y}$ is the set of elements selected in x and not selected in y ($Sel_{x-y}=Sel_x\backslash Sel_{xy}$) and $Sel_{y-x}$ is the set of elements selected in y and not selected in x ($Sel_{y-x}=Sel_y\backslash Sel_{xy}$).

In one embodiment a greedy path relinking algorithm GPR is utilized. In the GPR algorithm, the selection of the elements i and j is made in a greedy fashion. To obtain $p_{k+1}(x, y)$ from $p_k(x, y)$, all the possibilities for $i \in Sel_{pk(x,y)-y}$ to be de-selected and $j \in Sel_{y-pk(x,y)}$ to be selected are evaluated and the best swap is performed. In this way, the solution y is reached from x in $r=|Sel_{x-y}|=|Sel_{y-x}|$ steps ($p_r(x, y)=y$). The output of the GPR algorithm is the best solution, different from x and y, found in the path P(x, y), in other words, from among $p_1(x, y)$, $p_2(x, y)$, ..., $p_{r-1}(x, y)$.

In another embodiment, a greedy randomized path relinking algorithm GRPR is utilized. In the GRPR algorithm, instead of moving between the initiating and the guiding solutions in a greedy way, the moves are done in a greedy randomized fashion. A set of good candidates i and j is constructed for swapping and one swap is selected randomly from among them. This algorithm mimics the selection method employed in a GRASP construction.

To obtain $p_{k+1}(x, y)$ from $p_k(x, y)$ using the GRPR algorithm, all the possibilities for $i \in Sel_{pk(x,y)-y}$ to be de-selected and $j \in Sel_{y-pk(x,y)}$ to be selected are evaluated. The candidate set C contains all these swaps, in other words:

$$C_k(x, y)=\{(i, j)|i \in Sel_{pk(x,y)-y}, j \in Sel_{y-pk(x,y)}\}.$$

If z(i, j) is the value of the move associated with de-selecting i and selecting j in the current solution $p_k(x, y)$ to obtain $p_{k+1}(x, y)$, then:

$$z(i, j)=z_{MM}(p_{k+1}(x, y))-z_{MM}(p_k(x, y)).$$

In step k of the path from x to y, a restricted candidate list $RCL_k(x, y)$ of good candidates for swapping is constructed using the formula:

$$RCL_k(x, y)=\{(i, j) \in C_k(x, y)|z(i, j) \geq \delta z^*\},$$

where $z^*$ is the maximum of z(i, j) in $C_k(x, y)$ and $\delta$ ($0 \leq \delta \leq 1$) is a search parameter. The value of the $\delta$ parameter may be set empirically and may depend on a number of factors, including, but not limited to, the size m of the solution sets x and y. A pair i, $j \in RCL_k(x, y)$ is then randomly selected and the associated swap is performed.

In a further embodiment, a truncated path relinking algorithm is utilized. As described above, path relinking explores a path in the solution space from an initiating solution $x=p_0(x, y)$ to a guiding solution $y=p_r(x, y)$, where $r=|Sel_{x-y}|=|Sel_{y-x}|$ is the number of steps from x to y. At each intermediate solution $p_k(x, y)$, a restricted neighborhood of the solution is searched for the next solution in the path from $p_k(x, y)$ to y. The neighborhood is restricted because only moves that remove element $i \in Sel_{pk(x,y)-y}$ and put element $j \in Sel_{y-pk(x,y)}$ in its place are allowed. As the algorithm moves from one intermediate solution to the next, the cardinalities of sets $Sel_{pk(x,y)-y}$ and $Sel_{y-pk(x,y)}$ decrease by one element each. Consequently, as the algorithm nears the guiding solution, there are fewer allowed moves to explore and the search tends to be less effective. This suggests that path relinking tends to find good solutions near the initiating solution since it can explore the solution space more effectively around that solution. If this happens, then the effort made by path relinking near the guiding solution is fruitless.

In the truncated path relinking algorithm, a new stopping criterion is used. Instead of continuing the search until the guiding solution is reached, only $\kappa$ steps are allowed. In other words, the resulting path in the solution space is $p_1(x, y)$, $p_2(x, y)$, ..., $P_\kappa(x, y)$ and the best of these solutions is returned as the path relinking solution.

At operation 322 in FIG. 3B, the MMDP calculation module 108 applies the GPR algorithm, the GRPR algorithm, or a truncated variant to each distinct pair of solutions $x^i$ and $x^j$ in the elite set ES in both directions, in other words, $PR(x^i, x^j)$ from $x^i$ to $x^j$ and $PR(x^j, x^i)$ from $x^j$ to $x^i$. The best solution x generated by the path relinking algorithm in both paths is selected for further improvement. From operation 322, the routine 300 proceeds to operation 324, where the MMDP calculation module 108 subjects the solution x generated by the application of path relinking to the local search algorithm from the GRASP methodology to generate a further improved solution x'.

The routine 300 then proceeds from operation 324 to operation 326, where the MMDP calculation module 108 compares the solution x' to the current best solution $x^{best}$. If the solution x' is better than the current best solution $x^{best}$ ($z_{MM}(x')>z_{MM}(x^{best})$), then the routine 300 proceeds to operation 328, where the MMDP calculation module 108 replaces the current best solution $x^{best}$ with the new solution x'. Next, the routine 300 proceeds to operation 330, where the MMDP calculation module 108 determines if more distinct pair of solutions $x^i$ and $x^j$ exist in ES to which to apply path relinking. If path relinking is to be applied to another pair of solutions, then the routine 300 returns to operation 322 for another iteration of the application of path relinking to the distinct pair of solutions. Once path relinking has been applied to all distinct pairs of solutions in the elite set ES, the routine 300 ends, returning the current best solution $x^{best}$ as the approximate solution to the MMDP.

Figure 4A:
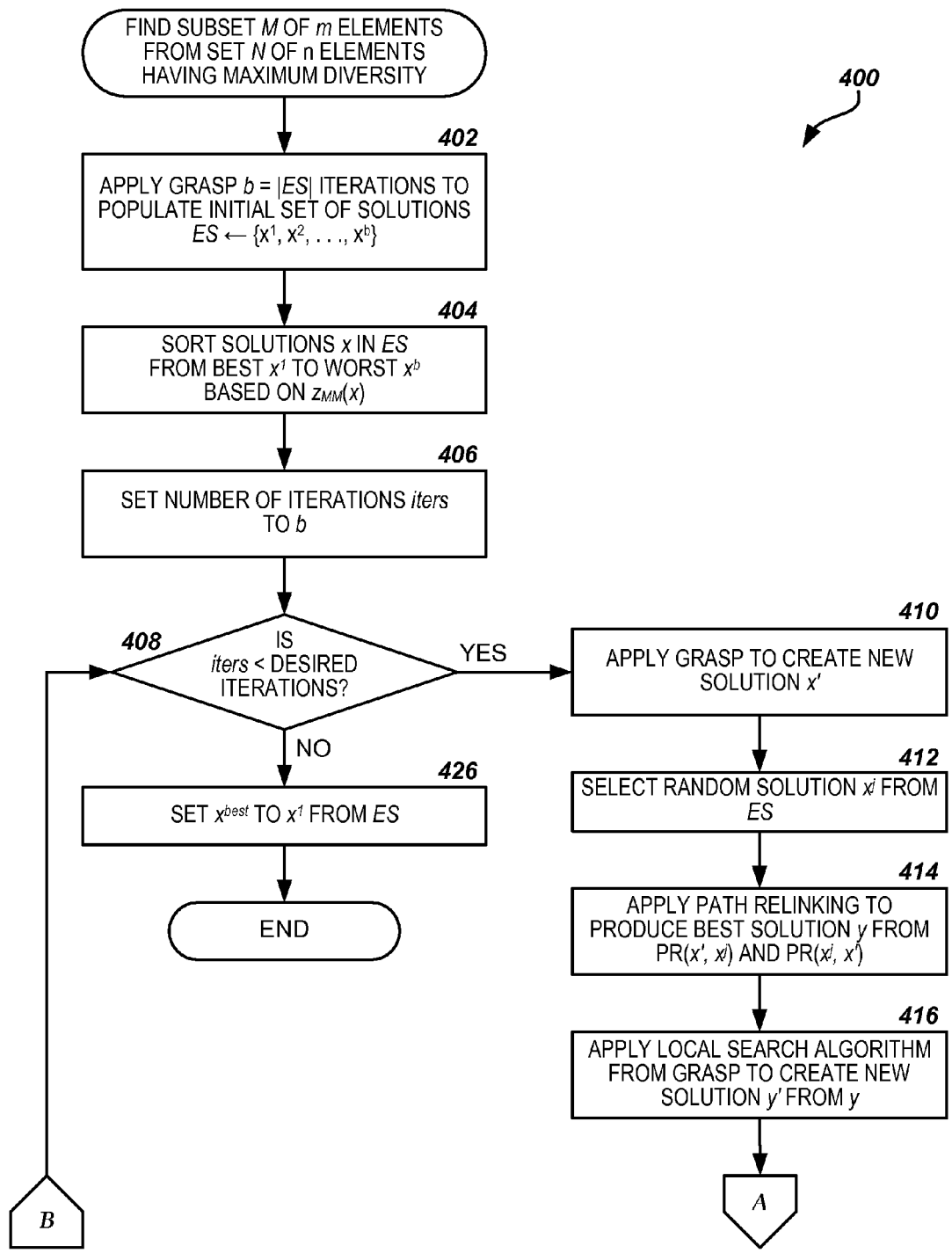
FIGS. 4A-4B are flow diagrams illustrating an alternative method for utilizing GRASP and path relinking methodologies to find optimal or near-optimal solutions to an MMDP, according to embodiments presented herein.
Figure 4B:
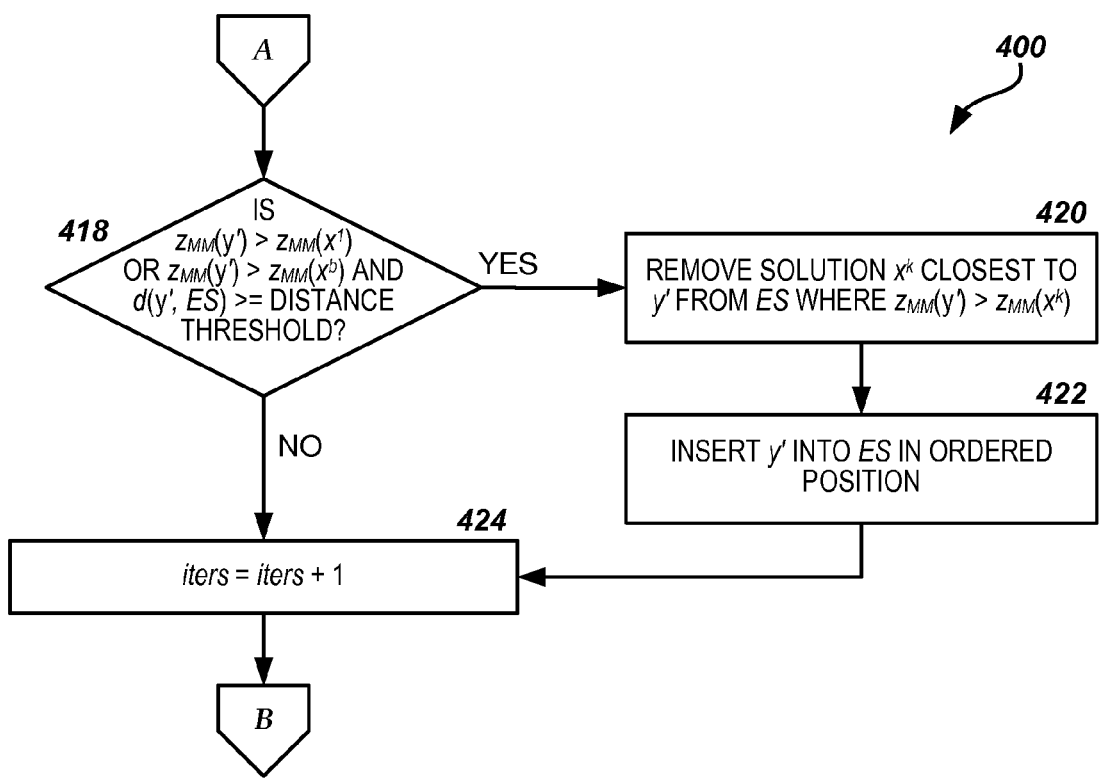

FIGS. 4A-4B show an alternative implementation of GRASP with path relinking for approximating a solution to the MMDP, according to a further embodiment. The previous routine 300 described above first applies GRASP to construct the elite set ES and then path relinking is applied to generate solutions between all the pairs of solutions in ES. A routine 400 illustrated in FIGS. 4A-4B consists in a dynamic update of the elite set ES by subjecting each solution x' generated with GRASP to path relinking, which is applied between x' and a solution $x^j$ selected from ES. The selection is probabilistically made according to the value of the solutions. The output of the path relinking is then directly tested for inclusion in the elite set ES.

The routine 400 begins at operation 402, where the MMDP calculation module 108 applies the GRASP methodology to the set N to initially populate the elite set ES. As described above in regard to operation 302, the MMDP calculation module 108 performs b iterations of the construction and local search algorithms of the GRASP methodology to create the elite set ES of b feasible solutions (b=|ES|). The routine 400 then proceeds from operation 402 to operation 404, where the MMDP calculation module 108 sorts the solutions $x^1, x^2, \ldots, x^b$ in the elite set ES from best $x^1$ to worst $x^b$ based on the value of the objective function $z_{MM}(x)$.

From operation 404, the routine 400 proceeds to operation 406, where the MMDP calculation module 108 sets a count of the number of iterations iters to the value of b, indicating that the GRASP methodology has been executed b times to initially populate the elite set ES. Next, the routine 400 proceeds to operation 408, where the MMDP calculation module 108 determines if the number of desired iterations of the dynamic procedure has been reached. If the MMDP calculation module 108 determines that the number of desired iterations of the dynamic procedure has not been reached, in other words, iters is less than the number of desired iterations, then the routine 400 proceeds to operation 410, where the MMDP calculation module 108 applies the construction and local search phases of the GRASP methodology to generate a new solution x'.

Then, at operation 412, the MMDP calculation module 108 selects at random a solution $x^j$ from the elite set ES.

From operation 412, the routine 400 proceeds to operation 414, where the MMDP calculation module 108 applies a path relinking algorithm between the solutions x' and $x^j$ in both directions, in other words, PR(x', $x^j$) from x' to $x^j$ and PR($x^j$, x') from $x^j$ to x'. The MMDP calculation module 108 may use the GPR algorithm, the GRPR algorithm, or a truncated variant. The best solution y generated by the path relinking algorithm in both paths is then subjected to the local search algorithm from the GRASP methodology to generate a further improved solution y' at operation 416.

The routine 400 proceeds from operation 416 to operation 418 as illustrated in FIG. 4B, where the MMDP calculation module 108 tests whether the new solution y' qualifies for inclusion in the elite set ES. Specifically, if the new solution y' is better than the best solution $x^1$ in ES ($z_{MM}(y') > z_{MM}(x^1)$), then the new solution y' qualifies for inclusion in the elite set ES. Moreover, if the new solution y' is better than the worst solution $x^b$ in ES and is sufficiently different from the solutions currently in ES, then solution y' also qualifies for inclusion in the elite set ES.

The MMDP calculation module 108 determines the difference between the new solution y' and the solutions in ES by calculating the distance value d(y', ES) using the formula described above in regard to operation 312. If $z_{MM}(y') > z_{MM}(x^b)$ and d(y', ES) is greater than or equal to some distance threshold, then solution y' qualifies for inclusion in the elite set ES. If it is determined in operation 418 that the new solution y' qualifies for inclusion in the elite set ES, then the routine 400 proceeds to operation 420, where the MMDP calculation module 108 removes from ES the closest solution $x^k$ to the new solution y' from among those worse than the solution y' in value ($z_{MM}(y') > z_{MM}(x^k)$). The routine 400 then proceeds from operation 420 to operation 422, where the MMDP calculation module 108 inserts the new solution y' into the elite set ES in the proper position such that ES remains ordered from best to worst.

Next, the routine 400 proceeds to operation 424, where the MMDP calculation module 108 increments the count of the number of iterations iters. The routine 400 then returns to operation 408 illustrated in FIG. 3A, where the MMDP calculation module 108 again determines if the number of desired iterations of the dynamic procedure has been reached. If the desired number of iterations has been reached, in other words, iters is not less than the number of desired iterations, then the routine 400 proceeds from operation 408 to operation 426, where the MMDP calculation module 108 sets the best solution $x^{best}$ to the best solution $x^1$ in the elite set ES. From operation 426, the routine 400 ends, returning the current best solution $x^{best}$ as the approximate solution to the MMDP.

Figure 5A:
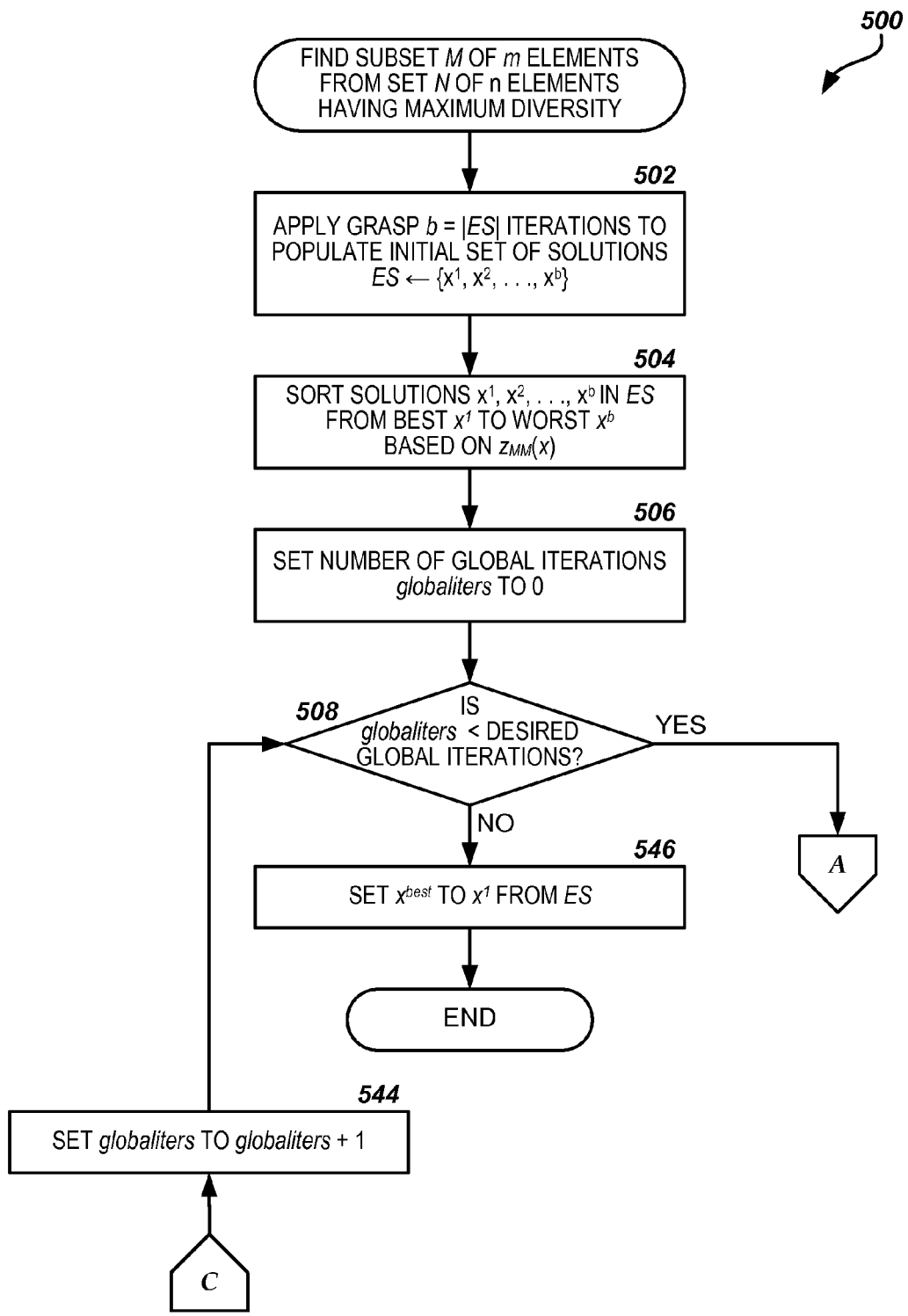
FIGS. 5A-5C are flow diagrams illustrating yet another method for utilizing GRASP and path relinking methodologies to find optimal or near-optimal solutions to an MMDP, according to embodiments presented herein.
Figure 5B:
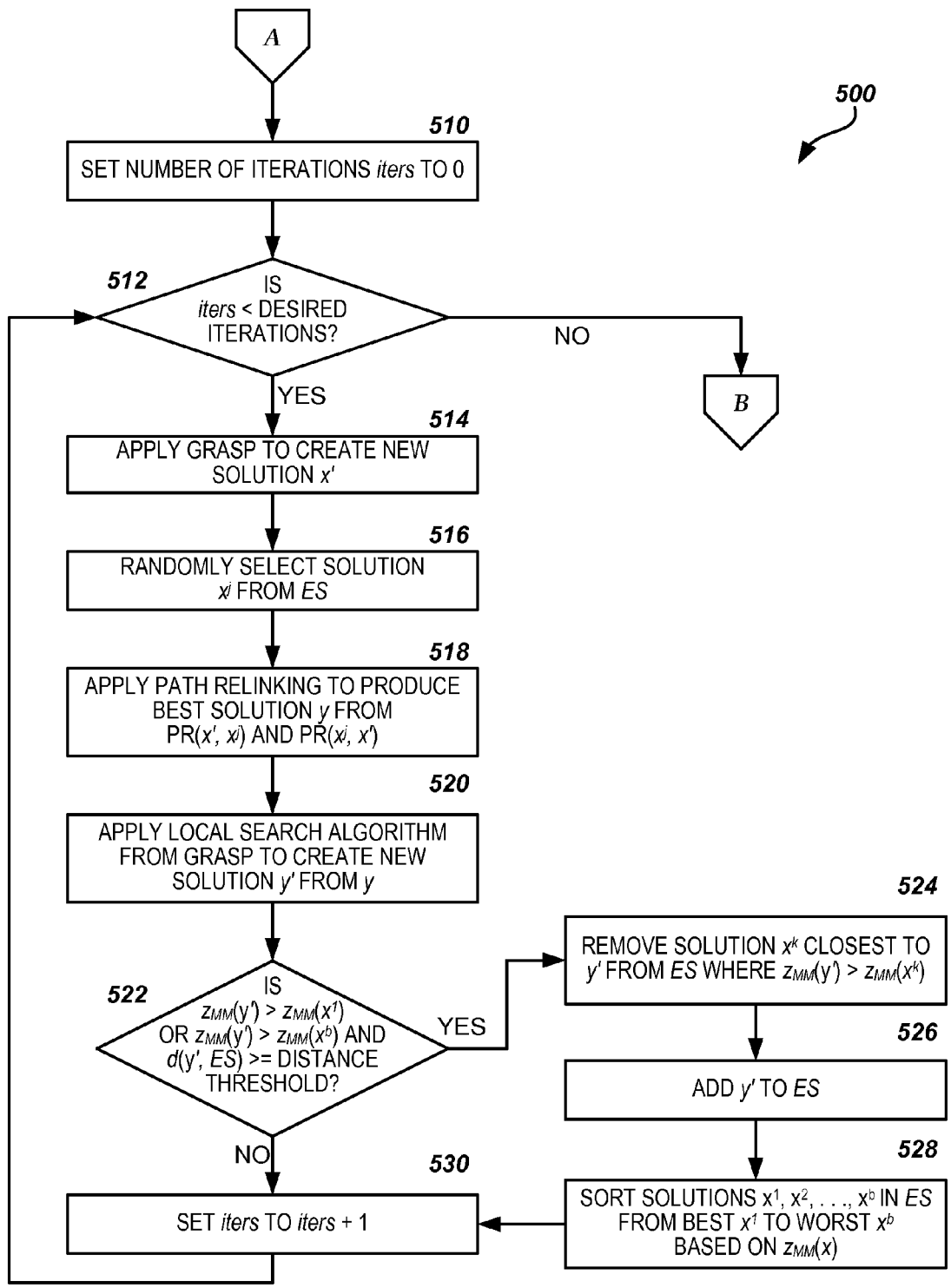
Figure 5C:
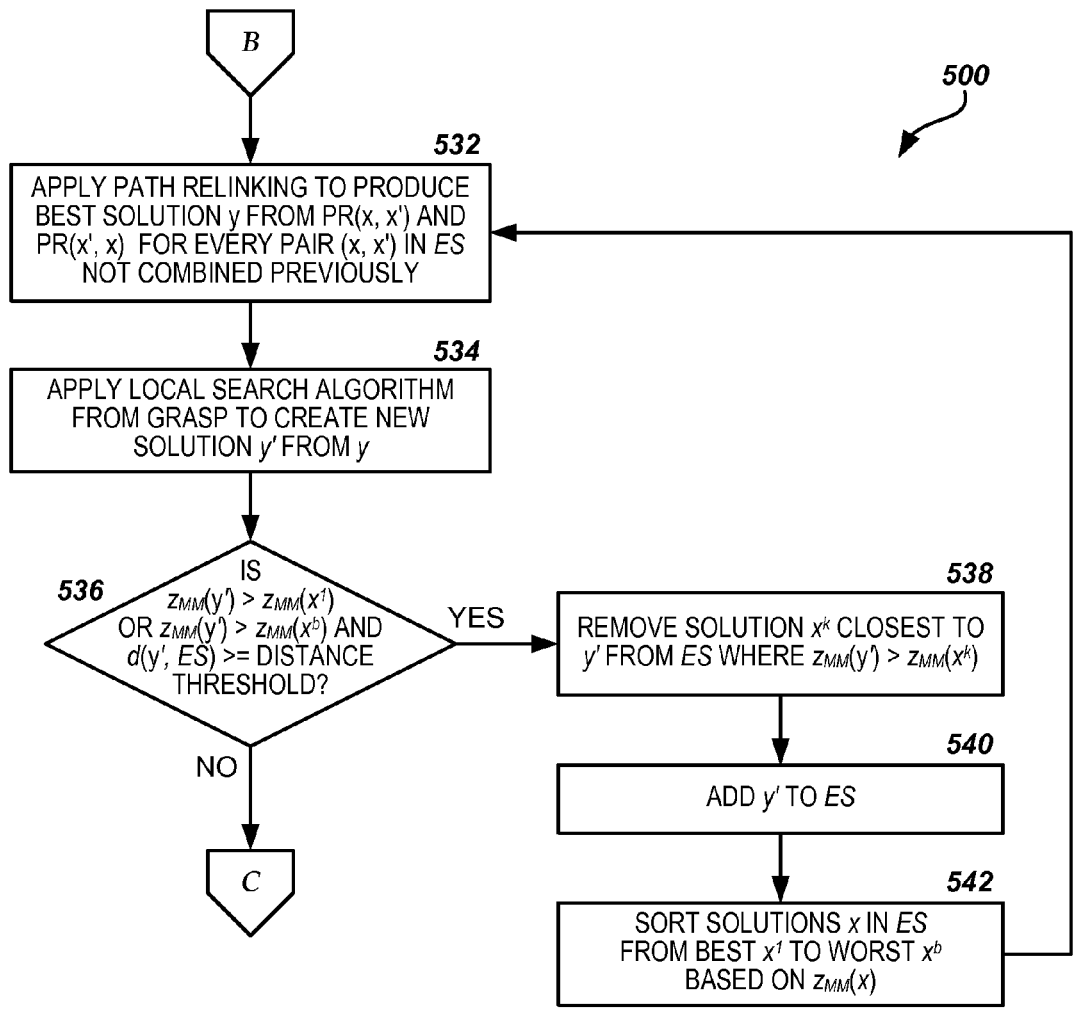

FIGS. 5A-5C show a further implementation of GRASP with path relinking for approximating a solution to the MMDP, according to another embodiment. A routine 500 illustrated in FIGS. 5A-5C begins with the GRASP construction of the elite set ES and the dynamic update of ES through path relinking, just as described above in regard to FIGS. 3A-3B. However, the routine 500 adds a post-processing phase based on path relinking applied to each pair of solutions in ES. The solutions obtained with this latter application of path relinking are considered to be candidates to enter ES, and path relinking is again applied to them as long as new solutions enter ES. In this way, the elite set ES is said to evolve.

The routine 500 begins at operation 502, where the MMDP calculation module 108 applies the GRASP methodology to the set N to initially populate the elite set ES. As described above in regard to operation 302, the MMDP calculation module 108 performs b iterations of the construction and local search algorithms of the GRASP methodology to create the elite set ES of b feasible solutions (b=|ES|). The routine 500 then proceeds from operation 502 to operation 504, where the MMDP calculation module 108 sorts the solutions $x^1, x^2, \ldots, x^b$ in the elite set ES from best $x^1$ to worst $x^b$ based on the value of the objective function $z_{MM}(x)$.

From operation 504, the routine 500 proceeds to operation 506, where the MMDP calculation module 108 sets a count of the number of global iterations globaliters to the value of 0. The count globaliters is used to ensure that the evolutionary procedure of dynamically updating ES and then performing the post-processing path relinking phase is iterated a specific number of times. The routine 500 proceeds from operation 506 to operation 508, where the MMDP calculation module 108 determines if the desired number of iterations of the evolutionary procedure has been performed.

If the MMDP calculation module 108 determines that the desired number of iterations has not been performed, in other words, globaliters is less than the number of desired iterations, then the routine 500 proceeds to operation 510 illustrated in FIG. 5B, where the MMDP calculation module 108 sets a count of the number of iterations iters to the value of 0. The count iters is used to ensure the procedure of dynamically updating ES is iterated a specific number of times. Next, the routine 500 proceeds to operation 512, where it is determined if the number of desired iterations of the dynamic procedure has been reached. If the MMDP calculation module 108 determines that the number of desired iterations of the dynamic procedure has not been reached, in other words, iters is less than the number of desired iterations, then the routine 500 proceeds to operation 514, where the MMDP calculation module 108 applies the construction and local search phases of the GRASP methodology to generate a new solution x'. Then, at operation 516, the MMDP calculation module 108 randomly selects a solution $x^j$ from the elite set ES.

From operation 516, the routine 500 proceeds to operation 518, where the MMDP calculation module 108 applies a path relinking algorithm between the solutions x' and $x^j$ in both directions, in other words, PR(x', $x^j$) from x' to $x^j$ and PR($x^j$, x') from $x^j$ to x'. The MMDP calculation module 108 may use the GPR algorithm, the GRPR algorithm, or a truncated variant. The best solution y generated by the path relinking algorithm in both paths is then subjected to the local search algorithm from the GRASP methodology to generate a further improved solution y' at operation 520.

The routine 500 proceeds from operation 520 to operation 522, where the MMDP calculation module 108 tests whether the new solution y' qualifies for inclusion in the elite set ES. Specifically, if the new solution y' is better than the best solution x in ES ($z_{MM}(y') > z_{MM}(x^1)$), then the new solution y' qualifies for inclusion in the elite set ES. Moreover, if the new solution y' is better than the worst solution $x^b$ in ES and is sufficiently different from the solutions currently in ES, then solution y' also qualifies for inclusion in the elite set ES.

The MMDP calculation module 108 determines the difference between the new solution y' and the solutions in ES by calculating the distance value d(y', ES) using the formula described above in regard to operation 312. If $z_{MM}(y') > z_{MM}(x^b)$ and d(y', ES) is greater than or equal to some distance threshold, then solution y' qualifies for inclusion in the elite set ES. If it is determined in operation 522 that the new solution y' qualifies for inclusion in the elite set ES, then the routine 500 proceeds to operation 524, where the MMDP calculation module 108 removes from ES the closest solution $x^k$ to the new solution y' from among those worse than the solution y' in value ($z_{MM}(y') > z_{MM}(x^k)$). The routine 500 then proceeds from operation 524 to operation 526, where the MMDP calculation module 108 adds the new solution y' to the elite set ES.

From operation 526, the routine 500 proceeds to operation 528, where the MMDP calculation module 108 resorts the solutions $x^1, x^2, \ldots, x^b$ in the elite set ES from best $x^1$ to worst $x^b$ based on the value of the objective function $z_{MM}(x)$. The routine 500 then proceeds to operation 530, where the MMDP calculation module 108 increments the count of the number of iterations iters. The routine 500 then returns to operation 512 to again determine if the number of desired iterations of the dynamic procedure has been reached. If the number of desired iterations of the dynamic procedure has been reached, then the routine 500 proceeds from operation 512 to operation 532 as illustrated in FIG. 5C to perform the post-processing path relinking phase.

At operation 532, the MMDP calculation module 108 applies a path relinking algorithm between each pair of solutions x and x' that have not been previously subjected to path relinking. The path relinking algorithm is applied in both directions, in other words, PR(x, x') from x to x' and PR(x, x') from x to x'. The MMDP calculation module 108 may use the GPR algorithm, the GRPR algorithm, or a truncated variant. The best solution y generated by the path relinking algorithm in both paths is then subjected to the local search algorithm from the GRASP methodology to generate a further improved solution y' at operation 534.

The routine 500 proceeds from operation 534 to operation 536, where the MMDP calculation module 108 tests whether the new solution y' qualifies for inclusion in the elite set ES using the same methodology described above in regard to operation 522. Specifically, if $z_{MM}(y')>z_{MM}(x^1)$ or if $z_{MM}(y')>z_{MM}(x^b)$ and d(y', ES) is greater than or equal to some distance threshold, then solution y' qualifies for inclusion in the elite set ES. If it is determined that the new solution y' qualifies for inclusion in ES, then the routine 500 proceeds to operation 538, where the MMDP calculation module 108 removes from ES the closest solution $x^k$ to the new solution y' from among those worse than the solution y' in value ($z_{MM}(y')>z_{MM}(x^k)$).

The routine 500 then proceeds from operation 538 to operation 540, where the MMDP calculation module 108 adds the new solution y' to the elite set ES. Next, at operation 542, the MMDP calculation module 108 resorts the solutions $x^1, x^2, \ldots, x^b$ in the elite set ES from best $x^1$ to worst $x^b$ based on the value of the objective function $z_{MM}(x)$. From operation 542, the routine 500 returns to operation 532, where the post-processing path relinking phase is continued as long as new solutions are added to the elite set ES, in other words, as long as it is determined at operation 536 that the solution y' qualifies for inclusion in ES. If, however, it is determined at operation 536 that a solution y' from the post-processing path relinking phase does not qualify for inclusion in ES, then the routine 500 proceeds to operation 544, where the MMDP calculation module 108 increments the count of the number of global iterations globaliters.

The routine 500 then returns to operation 508 where the MMDP calculation module 108 again determines if the desired number of iterations of the evolutionary procedure has been performed. If the desired number of iterations of the evolutionary procedure has been performed, in other words, globaliters is not less than the number of desired iterations, then the routine 500 proceeds to operation 546, where the MMDP calculation module 108 sets the best solution $x^{best}$ to the best solution $x^1$ in the elite set ES. From operation 546, the routine 500 ends, returning the current best solution $x^{best}$ as the approximate solution to the MMDP.

FIG. 6 is a block diagram illustrating a computer system 600 configured to maximize diversity in a subset of elements by utilizing the GRASP and path relinking methodologies to find an approximate solution to the MMDP, in accordance with exemplary embodiments. Such a computer system 600 may be utilized to implement the MMDP calculation module 108 described above in regard to FIG. 1. The computer system 600 includes a processing unit 602, a memory 604, one or more user interface devices 606, one or more input/output ("I/O") devices 608, and one or more network interface controllers 610, each of which is operatively connected to a system bus 612. The bus 612 enables bi-directional communication between the processing unit 602, the memory 604, the user interface devices 606, the I/O devices 608, and the network interface controllers 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the computer. Processing units are well-known in the art, and therefore not described in further detail herein.

The memory 604 communicates with the processing unit 602 via the system bus 612. In one embodiment, the memory 604 is operatively connected to a memory controller (not shown) that enables communication with the processing unit 602 via the system bus 612. The memory 604 includes an operating system 616 and one or more program modules 618, according to exemplary embodiments. Examples of operating systems, such as the operating system 616, include, but are not limited to, WINDOWS®, WINDOWS® CE, and WINDOWS MOBILE® from MICROSOFT CORPORATION, LINUX, SYMBIAN™ from SYMBIAN SOFTWARE LTD., BREW® from QUALCOMM INCORPORATED, MAC OS® from APPLE INC., and FREEBSD operating system. Examples of the program modules 618 include the MMDP calculation module 108. In one embodiment, the program modules 618 are embodied in computer-readable media containing instructions that, when executed by the processing unit 602, performs the routines 300, 400, and 500 for finding approximate solutions to the MMDP, as described in greater detail above in regard to FIGS. 3A-5C. According to further embodiments, the program modules 618 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 618. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network interface controllers 610 enable the computer system 600 to communicate with other networks or remote systems via a network 614. Examples of the network interface controllers 610 may include, but are not limited to, a modem, a radio frequency ("RF") or infrared ("IR") transceiver, a telephonic interface, a bridge, a router, or a network card. The network 614 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 614 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A computer-implemented method of selecting a plurality of routes between two nodes in a telecommunications network from a set of possible routes between the two nodes such that a diversity amongst the plurality of routes is maximized, the method comprising executing computer-executable instructions in a computer system to perform the operations of:
    determining the set of possible routes between the two nodes in the telecommunications network;
    modeling a max-min diversity problem for selecting the plurality of routes from the set of possible routes such that a minimum diversity between the plurality of routes is maximized;
    applying a greedy randomized adaptive search procedure heuristic to the set of possible routes between the two nodes for a number of iterations to generate a set of feasible solutions to the max-min diversity problem;
    determining a best solution from the set of feasible solutions;
    applying a path relinking heuristic between a pair of solutions in the set of feasible solutions to generate a first candidate solution;
    determining if the first candidate solution is better than the best solution;
    upon determining that the first candidate solution is better than the best solution, replacing the best solution with the first candidate solution;
    designating the best solution as an approximate solution to the max-min diversity problem; and
    selecting the plurality of routes based on the approximate solution.

2. The method of claim 1, wherein the path relinking heuristic is applied to each distinct pair of solutions in the set of feasible solutions.

3. The method of claim 1, further comprising applying a local search heuristic to the first candidate solution to improve the first candidate solution.

4. The method of claim 1, further comprising:
    applying the greedy randomized adaptive search procedure heuristic to the set of possible routes between the two nodes to generate a second candidate solution;
    determining if the second candidate solution improves one of a quality of the set of feasible solutions and a diversity among the set of feasible solutions;
    upon determining that the second candidate solution improves one of the quality of the set of feasible solutions and the diversity among the set of feasible solutions, removing from the set of feasible solutions a worse solution than the second candidate solution having a least diversity with the second candidate solution; and
    adding the second candidate solution to the set of feasible solutions.

5. A system for finding an approximate solution to a max-min diversity problem, comprising:
    a memory for storing a program containing computer-executable instructions for finding an approximate solution to the max-min diversity problem; and
    a processing unit functionally coupled to the memory, the processing unit being responsive to the computer-executable instructions and operative to:
    apply a greedy randomized adaptive search procedure heuristic to a set of possible routes between two nodes in a telecommunications network for a number of iterations to generate a set of feasible solutions to the max-min diversity problem,
    determine a best solution from the set of feasible solutions,
    apply a path relinking heuristic between a pair of solutions in the set of feasible solutions to generate a first candidate solution,
    determine if the first candidate solution is better than the best solution,
    upon determining that the first candidate solution is better than the best solution, replace the best solution with the first candidate solution, and
    designate the best solution as the approximate solution.

6. The system of claim 5, wherein the path relinking heuristic is applied to each distinct pair of solutions in the set of feasible solutions.

7. The system of claim 5, wherein the processing unit is further operative to apply a local search heuristic to the first candidate solution to improve the first candidate solution.

8. The system of claim 5, wherein the processing unit is further operative to:
    apply the greedy randomized adaptive search procedure heuristic to generate a second candidate solution;
    determine if the second candidate solution improves one of a quality of the set of feasible solutions and a diversity among the set of feasible solutions;
    upon determining that the second candidate solution improves one of a quality of the set of feasible solutions and a diversity among the set of feasible solutions, remove from the set of feasible solutions a worse solution than the candidate solution having a least diversity with the candidate solution; and add the second candidate solution to the set of feasible solutions.

9. The system of claim 8, wherein the processing unit is further operative to repeat the operations of apply, determine, remove, and add for a specified number of iterations.

10. A computer storage medium having computer executable instructions stored thereon that, when executed by a computer, cause the computer to:
apply a greedy randomized adaptive search procedure heuristic to a set of possible routes between two nodes in a telecommunications network for a number of iterations to generate a set of feasible solutions to a max-min diversity problem,
determine a best solution from the set of feasible solutions, the best solution comprising a solution having a maximum value of an associated objective function, the associated objective function representing a minimum diversity of the solution;
apply a path relinking heuristic between a pair of solutions in the set of feasible solutions to generate a first candidate solution;
determine if the first candidate solution is better than the best solution; and
upon determining that the first candidate solution is better than the best solution, replace the best solution with the first candidate solution.

11. The computer storage medium of claim 10, wherein the path relinking heuristic is applied to each distinct pair of solutions in the set of feasible solutions.

12. The computer storage medium of claim 10, having further computer executable instructions stored thereon that, when executed by a computer, cause the computer to apply a local search heuristic to the first candidate solution to improve the first candidate solution.

13. The computer storage medium of claim 10, having further computer executable instructions stored thereon that, when executed by a computer, cause the computer to:
apply the greedy randomized adaptive search procedure heuristic to generate a second candidate solution;
determine if the second candidate solution improves one of a quality of the set of feasible solutions and a diversity among the set of feasible solutions;
upon determining that the second candidate solution improves one of the quality of the set of feasible solutions and the diversity among the set of feasible solutions, remove from the set of feasible solutions a worse solution than the candidate solution having a least diversity with the candidate solution; and
add the second candidate solution to the set of feasible solutions.

14. The computer storage medium of claim 13, wherein the operations of apply, determine, remove, and add are repeated by the computer for a specified number of iterations.

15. A computer-implemented method of selecting a plurality of routes between two nodes in a telecommunications network from a set of possible routes between the two nodes such that a diversity amongst the plurality of routes is maximized, the method comprising executing computer-executable instructions in a computer system to perform the operations of:
determining the set of possible routes between the two nodes in the telecommunications network;
modeling a max-min diversity problem for selecting the plurality of routes from the set of possible routes such that a minimum diversity between the plurality of routes is maximized;
applying a greedy randomized adaptive search procedure heuristic to the set of possible routes between the two nodes for a first number of iterations to generate a set of feasible solutions to the max-min diversity problem;
applying the greedy randomized adaptive search procedure heuristic to the set of possible routes between the two nodes to generate a first solution;
selecting at random a second solution from the set of feasible solutions;
applying a path relinking heuristic between the first solution and the second solution to generate a first candidate solution;
determining if the first candidate solution improves one of a quality of the set of feasible solutions and a diversity among the set of feasible solutions;
upon determining that the first candidate solution improves one of the quality of the set of feasible solutions and the diversity among the set of feasible solutions, removing from the set of feasible solutions a worse solution than the first candidate solution having a least diversity with the first candidate solution;
adding the first candidate solution to the set of feasible solutions;
designating a best solution in the set of feasible solutions as an approximate solution to the max-min diversity problem; and
selecting the plurality of routes based on the approximate solution.

16. The method of claim 15, further comprising repeating:
applying the greedy randomized adaptive search procedure heuristic to the set of possible routes between the two nodes to generate a first solution;
selecting at random a second solution from the set of feasible solutions;
applying the path relinking heuristic between the first solution and the second solution to generate a first candidate solution;
determining if the first candidate solution improves one of a quality of the set of feasible solutions and a diversity among the set of feasible solutions;
upon determining that the first candidate solution improves one of the quality of the set of feasible solutions and the diversity among the set of feasible solutions, removing from the set of feasible solutions a worse solution than the first candidate solution having a least diversity with the first candidate solution; and
adding the first candidate solution to the set of feasible solutions for a second number of iterations.

17. The method of claim 15, further comprising applying a local search heuristic to the first candidate solution to improve the first candidate solution.

18. The method of claim 16, further comprising:
applying the path relinking heuristic between a pair of solutions in the set of feasible solutions not previously combined to generate a second candidate solution;
applying a local search heuristic to the second candidate solution to improve the second candidate solution;
determining if the second candidate solution improves one of the quality of the set of feasible solutions and the diversity among the set of feasible solutions;
upon determining that the second candidate solution improves one of the quality of the set of feasible solutions and the diversity among the set of feasible solutions, removing from the set of feasible solutions a worse solution than the second candidate solution having a least diversity with the second candidate solution; and adding the second candidate solution to the set of feasible solutions.

19. The method of claim 18, further comprising repeating:

applying the path relinking heuristic between a pair of solutions in the set of feasible solutions not previously combined to generate a second candidate solution;

applying a local search heuristic to the second candidate solution to improve the second candidate solution;

determining if the second candidate solution improves one of the quality of the set of feasible solutions and the diversity among the set of feasible solutions;

upon determining that the second candidate solution improves one of the quality of the set of feasible solutions and the diversity among the set of feasible solutions, removing from the set of feasible solutions a worse solution than the second candidate solution having a least diversity with the second candidate solution; and adding the second candidate solution to the set of feasible solutions as long as it is determined that the second candidate solution improves one of the quality of the set of feasible solutions and the diversity among the set of feasible solutions.

* * * * *